Dec. 21, 1965  W. T. WILLS, JR  3,224,304
QUICK CHANGE TOOL HOLDER
Filed Dec. 30, 1963
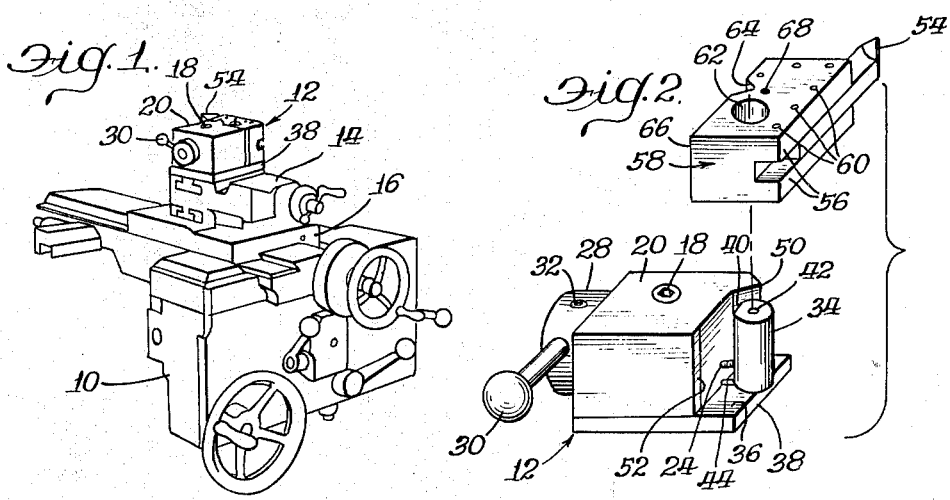
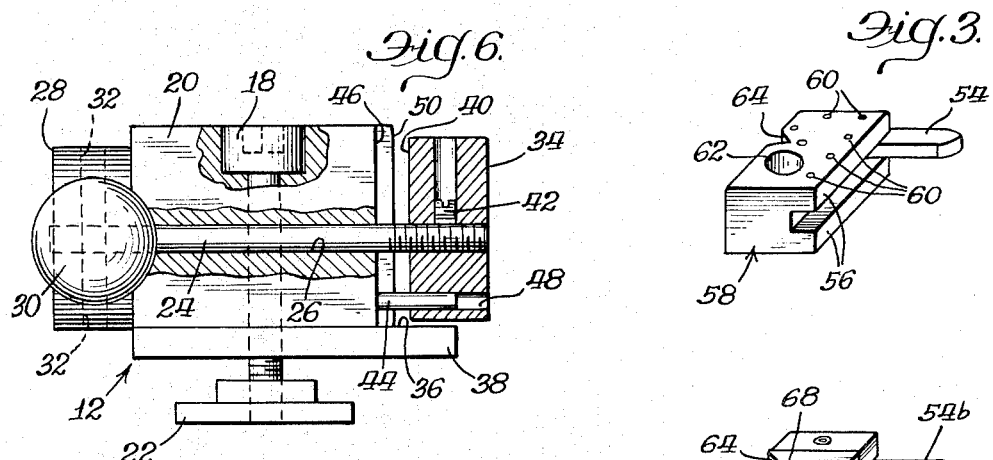
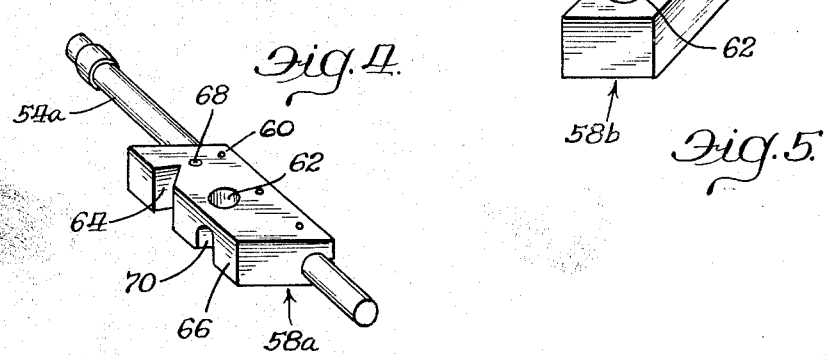
Witness:
R. Brown
INVENTOR.
William T. Wills
BY Walter L. Seidel, Jr.
Atty.

3,224,304
QUICK CHANGE TOOL HOLDER
William T. Wills, Jr., Los Angeles, Calif., assignor to Amsted Industries Incorporated, Chicago, Ill., a corporation of New Jersey
Filed Dec. 30, 1963, Ser. No. 334,349
2 Claims. (Cl. 82—36)

This invention relates to machine tools and more particularly to work tool holding devices which are secured to a compound rest assembly of a lathe.

Conventional lathe tool holding devices usually employ a cylindrical tool post mounted in a T slot of a compound rest assembly. The tool post in turn serves to support tool holders that hold the various tools used in facing, turning, cutting and boring operations. Whenever it is necessary to change tools in order to perform a different operation, the tool being used has to be removed from the tool holder and a new tool then placed in the tool holder. Before the new operation can be performed, the new tool must be adjusted to a proper height and a correct angular position. If it becomes necessary to reperform the original operation, the process of adjustment for height and angular position must be repeated in order to ensure the precise accuracy of the original operation. Also, if a subsequent operation is required that calls for another different tool, it is again necessary to adjust the newly placed tool so that the subsequent operation may be accomplished in a proper manner.

It therefore becomes evident that each successive machining operation requires a tool adjustment process to ensure that a correctly machined part is produced.

Such a process is time consuming and causes needless expense in labor and materials.

Accordingly, it is an object of this invention to provide a quick-change tool holder that eliminates the need for tool position adjustment between each successive machining operation.

An additional object of this invention is to provide a tool holding device that will maintain a precise setting even though removed from the work and subsequently repositioned into an operable position.

A further object of this invention is to provide a tool holding device that will permit interchangeability of tools in the same holding device.

Other objects and advantages of this invention will become apparent when reference is made to the following written description considered in conjunction with the accompanying drawings wherein:

FIGURE 1 is a perspective view of an apron and carriage assembly of a lathe showing the compound rest base to which the tool holder block is secured;

FIGURE 2 is a perspective view of the holder block with a tool holder disposed above the block in position to be mounted on the stud of the block;

FIGURE 3 is a perspective view of the tool holder as shown in FIGURE 2, but illustrating an alternate tool holding position;

FIGURE 4 is a perspective view of another tool holder illustrating the manner in which a boring bar is mounted in the holder;

FIGURE 5 is a perspective view of still another tool holder illustrating the manner in which a cutter bit is mounted in the holder;

FIGURE 6 is a front elevational view of the holder block, partly in section, showing details of construction.

Referring now to FIGURE 1, a conventional apron and carriage assembly 10 of a lathe is disposed to move back and forth along the ways of the lathe in a customary manner, deriving its motion from a usual type of power source located within a lathe. A tool holder block assembly 12 is secured to a compound rest base 14 of a cross slide 16 of the apron and carriage assembly 10. As seen in FIGURES 2 and 6, a socket head cap screw 18 extends through a generally vertical counterbored hole formed through the body 20 of the block assembly 12 and threadably engages a "T" adapter 22. The "T" adapter 22 is complementary to and received by a T shaped slot formed in the compound rest base. Cap screw 18 when tightened a selected amount is thereby effective to secure the block assembly 12 to the compound rest base 14 of the lathe.

A locking screw 24 extends through a generally horizontal drilled hole 26 formed through the body of the block assembly 12. A generally cylindrical collar 28 is located about the locking screw 24 near one end thereof in threadable engagement therewith. A handle 30 threadably engages one of a plurality of threaded holes 32 formed through the collar at substantially 90° intervals from one another.

The other end of the locking screw 24 threadably engages a generally cylindrical stud 34 disposed to have a bottom surface spaced from an upper surface 36 of an extension plate 38 of the block assembly. The stud 34 in its preferable form has a portion of its periphery formed to provide a flat surface 40 so that any cooperating member assembled about the stud will maintain at least two point contact therewith. A set screw 42 threadably engages a generally vertical aperture formed partially through the stud 34 and engages a portion of the other end of the locking screw 24, thereby maintaining the stud in any predetermined position on the locking screw.

A guide pin 44 is secured as by press fitting within an opening formed in a vertical surface 46 of the block assembly and projects therefrom to be slidably received by an aperture 48 formed through the stud 34.

The guide pin 44 is effective to maintain the stud 34 in a substantially vertical position and serves to prevent rotation of the stud about the axis of the locking screw 24.

A triangularly shaped truncated extension 50 is formed at one end of the vertical surface 46 and at its other end a machined boss 52 is formed thereon.

When handle 30 is rotated clockwise a selected amount, the collar 28 is turned on the end of the locking screw 24 and causes the locking screw to move axially through the collar. As a consequence, the stud 34 is moved toward the vertical surface 46 and remains in a vertical position by virtue of sliding over guide pin 44. Accordingly, counterclockwise rotation of handle 30 reverses the procedure and causes stud 34 to move away from vertical surface 46 with pin 44 continuing to keep the stud upright.

As best seen in FIGURE 2, a conventional turning tool 54 is located between longitudinal jaws 56 of a tool holder 58 and secured therein as by a plurality of set screws 60. A generally cylindrical hole 62 is formed vertically through the tool holder and is sized to slideably receive the stud 34 when the tool holder is located upon the stud of the block assembly 12. A triangularly shaped notch 64 is formed in a side surface 66 of the tool holder 58 and is located to complementally receive the extension 50 when the tool holder is located about the stud of the block assembly.

A height adjusting screw 68 is threadably received in a vertical opening formed through the tool holder generally near the apex of the notch 64. One end of the adjusting screw extends through the tool holder and bears against the upper surface 36 of the extension plate 38 when the tool holder is located about the stud of the block assembly. The adjusting screw 68 is effective to make and maintain minute elevational adjustments of the tool at the point of machining.

A generally U shaped slot 70, as best seen in FIGURE 4, is formed through the side surface 66 of the tool holder to connect with the hole 62. The slot serves to provide clearance between its side surfaces and both the locking screw 24 and the guide pin 44 when the tool holder is located about the stud of the block assembly.

In order to mount the tool holder 58 upon the stud 34 of the block assembly 12, the handle 30 must be rotated counterclockwise so that the stud moves away from the surface 46 a sufficient distance so that the tool holder may be placed upon the stud.

Clockwise rotation of handle 30 will urge stud 34 toward vertical surface 46. Movement of the stud toward the block assembly causes a portion of the side surface 66 of the tool holder 58 to abut the boss 52 of the block assembly and notch 64 to receive extension 50 in abutting contact therebetween.

The tool holder 58 is thereby secured to the block assembly 12 that is affixed to the compound rest of the carriage and is positioned properly so that the tool 54 may be moved by the apron and carriage assembly into contact with a work piece to perform a selected machining operation.

As best seen in FIGURE 3, the tool 54 may be positioned in the tool holder 58 in an alternate position. Thus the tool holder may be used for either a turning or a facing operation. Also, it would be possible to use a separate tool holder to hold a tool for a turning operation, and another tool holder to hold a tool for a facing operation. In this manner turning or facing operations may be done interchangeably without having to reposition the tool.

As seen in FIGURE 4, a boring bar 54a is secured in a tool holder 58a specially adapted for holding a boring bar. The tool holder 58a is otherwise similar to tool holder 58 and may be positioned and secured upon the block assembly in a manner described heretofore.

In FIGURE 5, a cutter bit 54b is secured in a tool holder 58b specially adapted to hold the cutter bit. The tool holder 58b is otherwise similar to tool holders 58 and 58a and may be positioned and secured upon the block assembly in the manner described heretofore.

It will be noted that a separate tool holder may be preferably provided for each of a plurality of tools. In this manner a multitude of machining operations may be performed and repeated by quick and easy removal and replacement of tool holders holding different tools. It will be seen that such utilization of tool holders eliminates the need for individual tool adjustment whenever a different tool is required during a series of consecutive machining operations.

Although but one embodiment of the invention is disclosed and described herein, it is apparent that other embodiments and modifications are possible within the scope of the appended claims.

I claim:

1. In a tool holding device mounted on a compound rest of a lathe for quick and easy interchangeability of tools for a specific machining operation, the combination comprising, a body member secured to the compound rest and having a vertical surface at one end, said vertical surface having vertically extending projections adjacent the lateral edges projecting beyond the portion of the surface therebetween, screw means extending horizontally through the body member and projecting through said vertical surface perpendicular thereto and between said projections, a vertical stud mounted on and carried by the end of said screw means adjacent said vertical surface, a handle on the opposite end of the screw means and operable upon actuation thereof for drawing the stud toward the body member and for releasing it therefrom, means for selectively positioning the handle means at different angular positions about the axis of the screw means, means for maintaining said stud in vertical position including a pin secured in said vertical surface slidably received in an aperture in the stud, said pin being displaced from but parallel with said screw means, a tool holder having a vertical hole for receiving the stud in downward fitting thereon, the tool holder having a vertical surface facing said surface on the body member when fitted on the stud and being drawn into firm engagement with the body member in response to the stud being drawn toward the body member, the tool holder engaging said projections when drawn into engagement with the body member and having a vertical groove receiving one of the projections, the interfacing surfaces on the body member and tool holder being so shaped as to enable complete separation of the body member and tool holder in moving them away from each other in direction perpendicular to the surfaces.

2. The invention set out in claim 1 wherein the body member includes a plate at said one end extending beyond said vertical surface at the bottom thereof and adjusting means is included in the tool holder adjacent said groove reacting against said plate for adjustably positioning the tool holder vertically.

References Cited by the Examiner

UNITED STATES PATENTS

| 2,466,596 | 4/1949 | Krause | 82—36 |
| 2,908,194 | 10/1959 | Lynn. | |
| 3,103,839 | 9/1963 | Mancuso | 82—36 |

FOREIGN PATENTS

| 426,534 | 10/1947 | Italy. |
| 145,807 | 6/1954 | Sweden. |
| 330,218 | 7/1958 | Switzerland. |

WILLIAM W. DYER, Jr., *Primary Examiner.*